Jan. 29, 1946.   F. J. ROGGAN   2,393,813
HAND-GENERATOR
Filed March 16, 1942
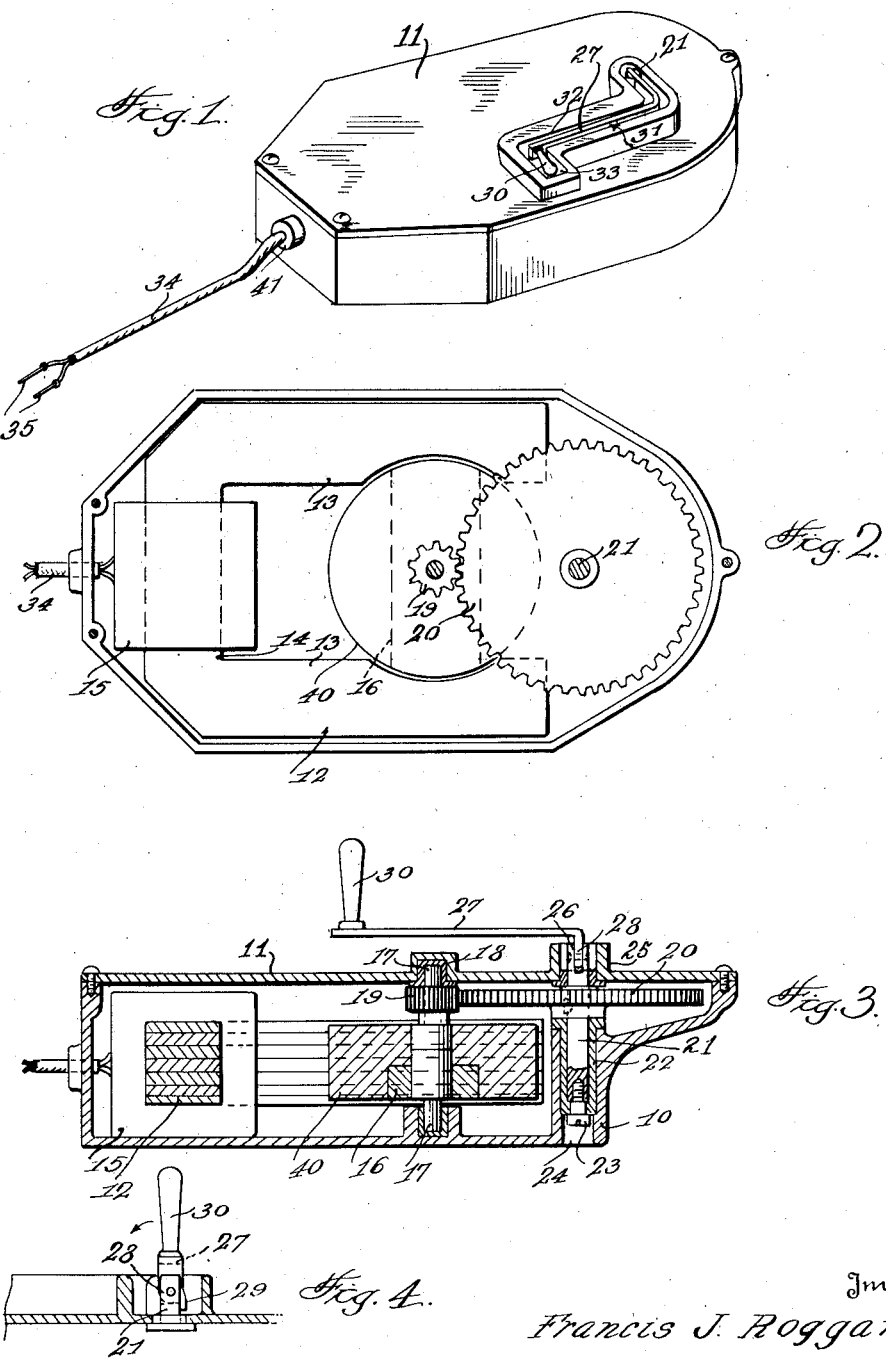
Inventor
Francis J. Roggan
By Christian R. Nielsen
Attorney Patented Jan. 29, 1946

2,393,813

UNITED STATES PATENT OFFICE 2,393,813

HAND GENERATOR

Francis Jerome Roggan, Buffalo, N. Y.

Application March 16, 1942, Serial No. 434,936

1 Claim. (Cl. 74—421)

The invention relates to mechanical generators of electricity, and particularly to those of the magneto type, and has for an object to present an embodiment of device of this nature which will be compact enough to be carried in the pocket, and which will have no projecting parts when so carried, and may be removed and operated at once for use in generating current for various purposes, the special use for which the invention is designed being the boosting of current in model airplane gasoline engines.

As is well known, at present, in order to start model airplanes having miniature internal combustion engines therein, it is a practice on account of the small size of the generating device for supplying current to ignite the charge in such engines and the impossibility of generating a satisfactory current without mechanism to rotate them at sufficient speed, to use a dry cell battery in starting the motor, one or more one-and-a-half volt common dry cells being connected in series in the primary ignition circuit of the plane motor, and after the motor has been started by turning the propeller manually, as customary, the battery is disconnected, as the speed of the motor is then sufficient to generate its own current with the device incorporated therein.

It is therefore an object of my invention to present a vest pocket size generator device adapted to be operated by hand to supply the small current required for starting of such motors, and which may be operated by crank, but with all operating parts enclosed within a case so that no projections are involved which would prevent inserting the device readily in the pocket, or withdrawing the same therefrom.

A further important aim of the invention is to present a novel casing for each unit, and a novel coordination of crank, gear-train and casing, to the end of enabling the rapid arrangement of the parts, either for operation or collapse and insertion in the pocket.

Additional objects, advantages and features of invention resides in the arrangement, construction and combination of parts involved in the embodiment of the invention, as will be more readily understood from the following description and accompanying drawing, wherein Figure 1 is a perspective view of a device constructed in accordance with my invention.

Figure 2 is a similar view thereof with the cover removed.

Figure 3 is a longitudinal sectional view of the machine.

Figure 4 is a detail cross section of the mounting of the crank in a plane at right angles to the plane of Figure 3.

Referring to the drawing, there is illustrated a device comprising a case 10, which may be molded from one of the synthetic gum plastics, or other suitable plastic of insulating material, especially shaped to conform to the general contours of the elements of my machine to be incorporated therein, this case 10 being open at the upper side in the body part, this side being closed by a cap plate or removable wall 11, which may be attached to the case by screws or other fastenings.

Set in the case and secured therein in a conventional way there is a horse-shoe type field 12, having respective legs 13, joined by a usual bight portion 14, around which there is a conventional winding 15 suited for the purposes contemplated. Between the legs of the field piece there is mounted a usual rotatable magnet armature 16, having shaft or trunnion portions 17 carried in suitable bushings 18 in the bottom of the case and in the top plate 11, these being made of suitable anti-friction material. Fixed on the shaft of the magnet adjacent the top plate 11, there is a small pinion 19 meshed with which there is a very large gear 20, the ratio of which with respect to the small gear is preferably in the neighborhood of twenty to one. This large gear is keyed to a shaft 21, the lower end of which is set in a step bearing 22 to which the case is molded, and held against longitudinal withdrawal therefrom by a screw 23 engaged through the bottom of the step bushing 22 and removable through a suitable opening 24 in the lower side of the case, if desired. The upper end of the shaft 21 is extended through a bushing 25 fixed in the cap plate 11, and the gear 20 is held against loose play between the inner flange ends of the bushings 22 and 25, as may be seen in Figure 3. The upper end of the shaft 21 is slotted, forming ears 26, and these are utilized for the mounting of an operating crank 27. The cap plate 11 is considerably thickened around the bushing 25, and longitudinally therefrom toward the opposite end of the case. The crank 27 consists of a simple bar, which may be rectilinear in form, as shown in the present instance, or may be otherwise formed if desired, and at its end adjacent the shaft 21 is formed with a lateral ear 28, fixed between the ears 26, and pivoted therebetween, so that it may lie at times with the crank bar 27 arranged over the end of the shaft 21, and at other times may be moved pivotally so that the crank 27 is swung downwardly beside the shaft and close in toward the case 10. The ear 28 may be provided with a shoulder 29, arranged to strike against the side of the shaft 21 when the handle is moved to operative position, as shown in Figure 4, so as to check such movement of the ear and crank when the latter is in its outermost position.

At its extremity, the crank bar 27 is provided with an operating handle 30, by which it may be operated to drive the gear 20, and so rotate the pinion and magnet 16, for the purposes indicated.

The cap plate 11 of the casing in its thickened part is formed with a recess 31, having a long portion 32 extending besides the shaft 21, and having an extension at its side opposite the shaft as at 33, this extension being at right angles to the portion 32, and much wider, so as to receive the handle 30 when the bar 27 is moved on the ear 28 as a pivot to its inner position, as shown in Figure 1. The side of the portion 32 of the recess 31 may be rounded, and also the ends of the ears 25 similarly rounded, in order to permit the pivotal movement of the bar 27 from its outermost position to its inner position beside the shaft.

The terminals of the winding 15 are connected to respective lead wires 34, which may be equipped with standard jack plugs 35, or other terminals adapted for insertion or connection otherwise to the ignition circuit of an internal combustion motor or other circuit to be energized.

It should be noted that the recess 31 is located with respect to the shaft 21 so that with the crank 27 and handle 30 in position for operating the shaft, when the crank is moved into position parallel to and extending in the same general longitudinal direction as the portion 32 of the recess 31, the crank may be moved into the recess by rotation on a horizontal axis in a direction counter-clockwise with respect to the shaft 21. In consequence, when the crank is moved to operative position for driving the magnet 16, and being operated in a clockwise direction as customary in hand generator sets, the shoulder 29 will thereby be forced downwardly against the side of the shaft 21 and tilting or movement of the bar 27 beyond proper operative position will be prevented, and it will not tend to move to lowered position during operation, because that tendency will only develop by operation of the crank in a counter-clockwise direction, which is not required in such a device.

The armature shown may be of a conventional type, and in the present instance, includes a body portion 40, which may be made of non-magnetic metal, and a transversely arranged bar magnet 16 secured therein in a conventional way. The trunnions 17 are preferably of hard steel, one being shown as engaged in the magnet 16, and the other in the mounting element 40. The mounting body 40 for the armature is made of cylindrical form, so that its mass added to that of the magnet 16 will serve the function of a fly-wheel and enable smoother operation of the device when in use. The lead wires 34 from the windings 15 are led from the case through an insulator bushing 41, engaged in a suitable threaded opening in the side of the case 10 adjacent the winding.

While I have disclosed and described with great particularity a specific embodiment of my invention, in the best form known to me at this time, it will nevertheless be understood that this is purely exemplary, and that various changes in construction, arrangement and combination of parts, substitution of materials, and substitution of mechanical equivalents may be made without departing from the spirit of the invention, as more particularly defined in the appended claim, wherein I claim:

In a device of the character described, a case comprising a body portion open at one side and having a cap plate thereon, a manually driven gear train having a drive gear and drive shaft therefor mounted within the case, said drive shaft being extended through said cap plate, an operating crank pivoted on the last named end of the shaft, and movable from operative position into a retracted position, the crank in the latter position lying in a plane parallel to said cap plate, the cap plate having a member provided with a recess therein conforming to the shape of the operating crank, and including a portion extended outwardly from said shaft to receive the operating crank when moved pivotally on the shaft to retracted position, whereby the operating crank is enclosed substantially within the surface boundaries of the case, said operating crank consisting of a bar having a lateral ear extended therefrom, the drive shaft being slotted to receive said ear therein for pivotal movement in a plane transverse to the major axis of the operating crank, said operating crank further having a handle at one side, means to check pivotal movement of said ear on the shaft in one direction of pressure against the operating crank, and the recess of said cap plate being arranged with an elongated part extended outwardly from the shaft and having a right angle extension to receive said handle when the operating crank is in retracted position.

FRANCIS JEROME ROGGAN.